United States Patent [19]

Stier

[11] 4,352,404

[45] Oct. 5, 1982

[54] DEVICE FOR THE CONTROL OF THE TRAVELING SPEED OF A MOTOR VEHICLE

[75] Inventor: Bernhard Stier, Kelkheim-Fischbach, Fed. Rep. of Germany

[73] Assignee: VDO Adolf Schindling AG, Frankfurt am Main, Fed. Rep. of Germany

[21] Appl. No.: 82,826

[22] Filed: Oct. 9, 1979

[30] Foreign Application Priority Data

Oct. 14, 1978 [DE] Fed. Rep. of Germany ....... 2844829

[51] Int. Cl.[3] ........................ B60K 31/00; B60K 41/20

[52] U.S. Cl. .................................... 180/179; 123/350; 123/361; 192/3 M; 180/170

[58] Field of Search ............... 180/179, 177, 178, 170; 123/361, 352, 351, 350, 349; 192/3 M

[56] References Cited

U.S. PATENT DOCUMENTS 4,046,213 9/1977 Larson ................................ 180/177

4,120,373 10/1978 Fleischer ............................ 180/179

4,157,126 6/1979 Collonia ............................. 180/176

4,196,787 4/1980 Sakakibara et al. ................ 180/179

*Primary Examiner*—Joseph F. Peters, Jr.
*Assistant Examiner*—Milton L. Smith
*Attorney, Agent, or Firm*—Martin A. Farber

[57] ABSTRACT

A device for the control of the traveling speed of a motor vehicle with an electrical controller applied by an actual speed signal and a desired speed signal, an output stage which contains a servo-motor being in operative connection with an element, preferably the throttle valve, which element influences the ratio of the fuel-air mixture that is supplied to the vehicle engine, and the output stage being electrically connected to a first switch which is coupled to the foot brake to switch the output stage into an inoperative condition if the foot brake is actuated. An additional switch which is actuatable by output stage, which switches are disposed in an electrical control circuit (which circuit influences the rotational speed of the engine) are embodied such that if the brake is actuated and if the output stage is outside the idling position the control circuit is controlled in the sense of a reduction of the rotational speed.

7 Claims, 1 Drawing Figure

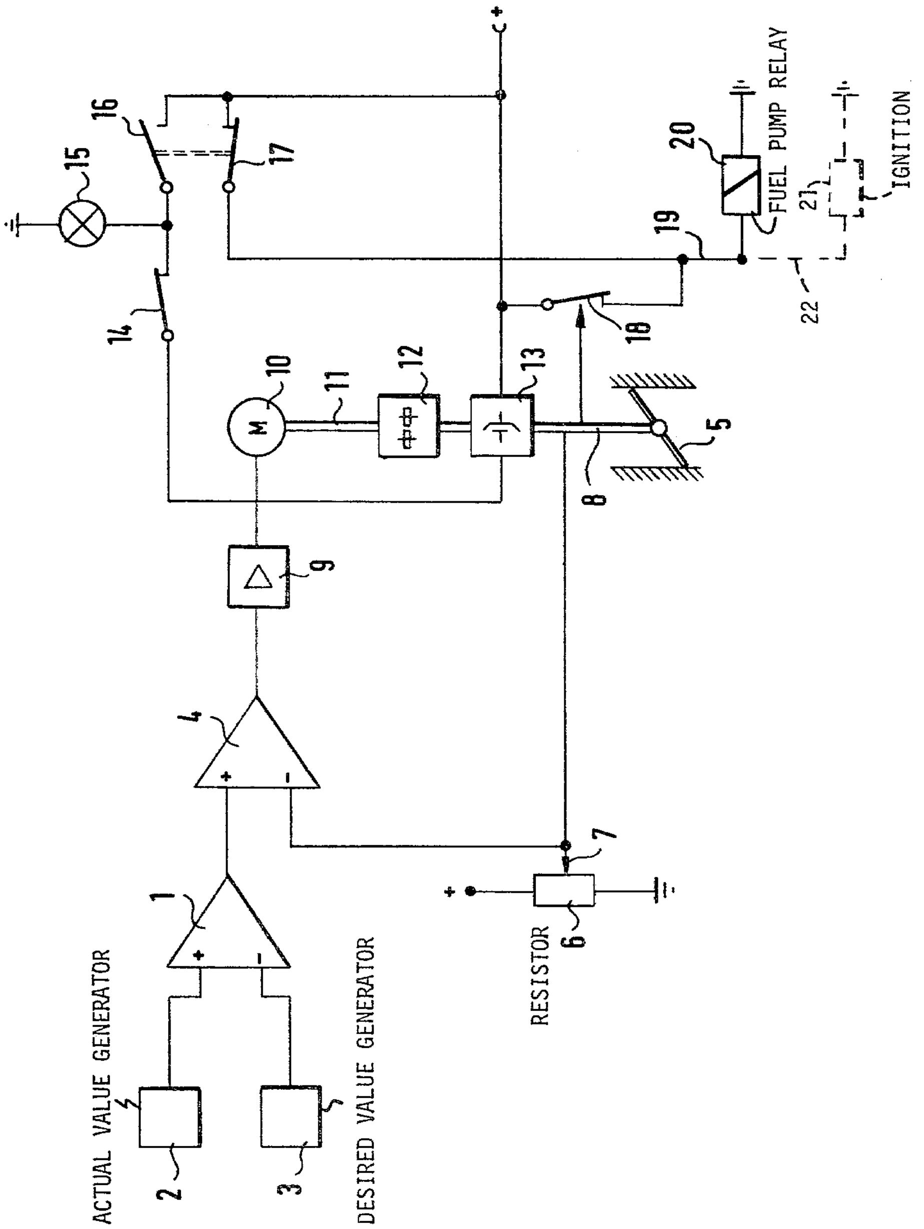
ACTUAL VALUE GENERATOR
DESIRED VALUE GENERATOR
RESISTOR
FUEL PUMP RELAY
IGNITION
1
2
3
4
5
6
7
8
9
10
11
12
13
14
15
16
17
18
19
20
21
22
M
+

DEVICE FOR THE CONTROL OF THE TRAVELING SPEED OF A MOTOR VEHICLE

The invention relates to a device for the control of the traveling speed of a motor vehicle with an electrical controller applied by an actual speed signal and a desired speed signal and an output stage, which contains a servomotor in operative connection with an element, preferably the throttle valve, which element influences the ratio of the fuel-air mixture that is supplied to the vehicle engine, and the output stage being electrically connected to a first switch which is coupled to the foot brake to switch the output stage into an inoperative condition if the foot brake is actuated.

With known devices of this type which can contain a pneumatic or electrical regulating unit, there exist a manually actuatable switch for turning on and turning off the controller and the control device, respectively, and the switch (which is actuatable by means of the foot brake) for switching off the control device upon initiation of a braking operation. With motor vehicles with a manual gear shift there is provided in addition a switch which is connected to the clutch pedal, by means of which switch the control device is switched off during a shifting operation. With an electrical output stage these switches energize or trigger an electromagnetic coupling, which electromagnetic coupling is arranged in the output stage between the servomotor and that part of the output stage which is coupled with the throttle valve and this connection occurs during the braking, clutching or manual disengagement. With a pneumatic output stage in the case of braking, clutching or disengagement, the subatmospheric pressure space is supplied with atmospheric pressure by means of a quick-acting ventilation valve or vent and the electrical part of the controller is switched off.

Although such devices are designed for an increased reliability of operation, nevertheless situations of disturbance are conceivable in which the output stage and/or the throttle valve do not return into their idling position upon a braking, clutching or disengaging operation, but rather remain stuck in a position in which the engine is operated with a rotational speed which is higher than the idling rotation. Such situations of disturbance can lead to erroneous reactions or misjudgements in the case of inexperienced drivers and as a result can lead to accidents.

It is an object of the invention to take measures by which the reliability of operation of the device is improved further, and particularly during a possible occurrence of the previously mentioned situations of disturbance, a misjudgement or erroneous reaction by the driver is avoided, in the manner that in the disturbance situation the rotational speed of the motor is necessarily reduced or is stopped completely.

This task is aided in its solution in accordance with the invention in the manner that there are present an additional switch which is actuatable by means of the foot brake and a switch which is coupled with the output stage which switches are disposed in an electrical control circuit (which circuit influences the rotational speed of the engine) embodied such that if the brake is an actuated brake and if the output stage is not in the idling position the control circuit is controlled in the sense of reducing the rotational speed.

By these measures in accordance with the invention it is achieved that whenever the element which controls the fuel-air mixture is in an unpermissible position the rotational speed of the motor is compelled necessarily to reduce without action on the part of the vehicle driver. The consequence is that in spite of the disturbance the vehicle is brought to a condition of operative safety. A particular advantage of the invention is that with a corresponding construction of the device the expenditure for components and assembling for these measures is exceptionally low and only slight costs occur.

According to an advantageous embodiment of the invention, the switch which is actuatable via the foot brake can be formed as a normally closed contact and the other switch can be formed as a contact which is closed when the output stage is in the idling position, whereby both switches are connected in parallel in the electric circuit which influences the rotational speed. The normally closed contact which is actuatable by means of the foot brake can be formed as an additional contact of the brake light switch, which is actuated upon stepping down on the foot brake. The other switch can be arranged as an end contact or limit switch either in the range of action of the element which influences the fuel-air mixture or in the range of action of the movable part of the regulating unit. A possibility also exists to actuate the switch by means of the connecting rods or gears which are present between the output stage and the element which influences the fuel-air mixture.

Both switches according to one embodiment of the invention can be disposed in the ignition circuit, or, which is particularly advantageous, they can be disposed in the fuel pump relay circuit.

With the above and other objects and advantages in view, the present invention will become more clearly understood in connection with the detailed description of a preferred embodiment, when considered with the accompanying drawings, of which the only FIGURE is a schematic circuit diagram of a vehicle speed control device according to the invention.

The vehicle speed control device contains a first comparator circuit 1, the inputs of which are wired or connected with a generator 2 of the actual value of the speed and with a generator 3 of the desired value of the speed. The comparator circuit 1 forms a difference value between the desired value signal and the actual value signal. In an additional comparator circuit 4 this difference value as the desired value of the throttle valve position is compared with the actual position of the throttle valve 5, the actual position of the throttle valve being represented as a voltage signal by means of the resistor 6. For this purpose the wiper or slider 7 of the resistor 6 is coupled with the actuating element 8 of the throttle valve 5. The servomotor 10 is controlled by the output signal of the comparator circuit 4 via an amplifier 9, the output signal of the comparator 4 being the proportional difference between the desired value of the throttle valve position and the actual value of the throttle valve position. The setting or positioning shaft 11 of the servomotor 10 is in operative connection with the actuating element 8 by means of a transmission or gearing 12 and an electromagnetic coupling 13.

The excitation winding of the electro-magnetic coupling 13 on the one side is at positive potential and on the other side via a switch 14 and the braking light 15 is grounded. The switch 14 is constructed as a normally closed contact and is operatively connected with the clutch pedal of the motor vehicle. The brake light 15 via the brake light switch 16 (which switch is formed as a normally open contact) is directly connected to the positive (t) potential. Upon stepping down on the clutch pedal for engagement of the clutch, the switch 14 opens, whereby the excitation winding of the electromagnetic coupling 13 becomes without current (i.e., currentless) and the coupling 13 separates the gearing or tranmission 12 from the throttle valve 5. Likewise a separating operation of the electro-magnetic coupling 13 takes place when the foot brake is pressed down and automatically along with this the switch 16 is closed since in this case the largest portion of the current flows from the (+) terminal to ground via closed switch 16 and light 15, while the remaining current portion which flows through the coupling 13, the switch 14 and the light 15 to ground is too small to keep the electromagnetic coupling 13 in the coupled condition.

An additional switch 17 which is formed as a normally closed type contact is in operative (mechanically ganged) connection with the brake light switch 16, and indeed specifically such that upon stepping down on the brake and closing of the switch 16, the switch 17 opens, and when the brake is not stepped down on (i.e. not actuated) the switch 17 is closed.

Moreover a switch 18 is provided which is closed in the idling position of the throttle valve 5 and opens when the throttle valve 5 is pivoted out of its idling position. The actuation of the switch 18 takes place by the actuating element 8.

The two switches 17 and 18 are connected in parallel to one another and are disposed in the circuit 19 of the fuel pump relay 20 or in the circuit 22 of the ignition 21.

For explanation of the manner of operation of the safety circuit (comprising essentially the two switches 17 and 18), let us assume that we start out with the vehicle in the controlled driving condition moving along on the road or street. In this case the switch 17 is closed (since the brake is not stepped down on) and the switch 18 (which switch indeed is closed only in the idling position of the throttle valve 5) is open.

When the vehicle driver actuates the brake, the switch 16 closes and simultaneously the switch 17 is opened. By the closing of the switch 16 the excitation winding of the electro-magnetic coupling 13 becomes essentially without current (as described above). The throttle valve 5 then returns into its idling position since the coupling 13 is disconnected, whereby the switch 18 closes. Although now the switch 17 is open, the circuit 19 of the fuel pump relay 20 stays practically in operation, since indeed the switch 18 is closed by current flowing from (+) through switch 18 and fuel pump relay 20 to ground.

If however when the brake is actuated a disturbance or trouble is present in the coupling 13 (for example if this does not interrupt the circuit when the excitation winding becomes currentless or if for some other cause the throttle valve is prevented 5 from moving back to its idling position) then the switch 18 remains open and, since the switch 17 has also been opened by the braking operation, the circuit 19 of the fuel pump relay 20 is now interrupted and the fuel pump relay deenergizes. This has the result of interrupting the fuel supply to the motor and consequently the rotational speed of the motor falls to zero.

These disclosed embodiments of the invention are given by example only and not in a limiting sense.

I claim:

1. In a device for the control of the traveling speed of a motor vehicle with an electrical controller having a first input connected to an actual speed signal generator, a second input connected to a settable desired speed signal generator, and an output stage which contains a servomotor in operative connection with an element, preferably the throttle valve, which element influences the ratio of the fuel-air mixture that is supplied to the vehicle engine, the output stage being electrically connected to a first switch which is coupled to the foot brake to switch into an inoperative condition if the foot brake is actuated, the improvement comprising a second switch actuatable by means of the foot brake, a third switch in operative connection with said element, an electrical control means for influencing the rotational speed of the vehicle engine, said electrical control means being electrically actuatable by said second switch and said third switch in the sense of a reduction of the rotational speed of the engine if the brake is actuated and the element is outside of the idling position.

2. The device as set forth in claim 1, wherein said second switch is formed as a normally closed contact, said third switch is formed as an other contact, said other contact is closed in the idling position of the element, and both said second switch and said third switch are connected in parallel to one another disposed in said electrical control means.

3. The device according to claim 1, wherein said second switch and said third switch are disposed in an ignition circuit of the motor vehicle, said electrical control means includes said ignition circuit.

4. The device according to claim 1, wherein said second switch and said third switch are disposed in a fuel pump relay circuit of the motor vehicle, said electrical control means includes said fuel pump relay circuit.

5. The device according to claim 1, wherein said first switch and said second switch are ganged together, one of said first and second switches is a normally opened switch and the other is a normally closed switch.

6. The device according to claim 1 or 2, further comprising means for operatively connecting said third switch to said element such that said third switch is open when said element is outside of the idling position and is closed when said element is in the idling position.

7. The device according to claim 6, wherein said second switch is operatively connected to the foot brake such that it is open when said foot brake is stepped down on.

* * * * *